May 4, 1965     W. D. VOELKER     3,181,199
FROTH APPLICATOR
Filed Dec. 7, 1961
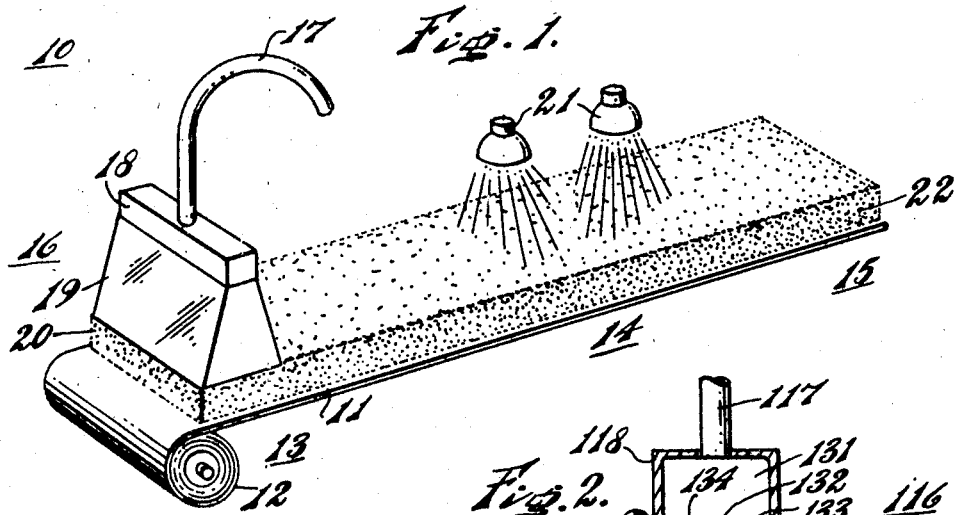
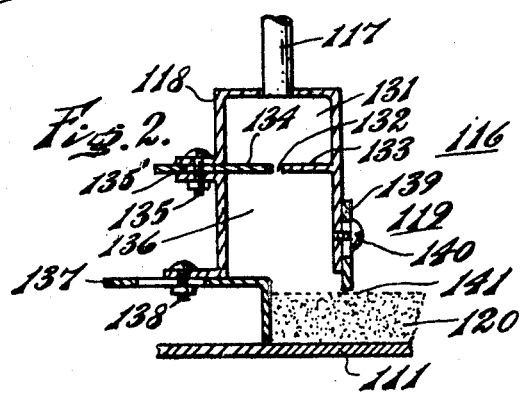
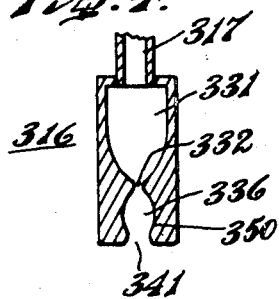
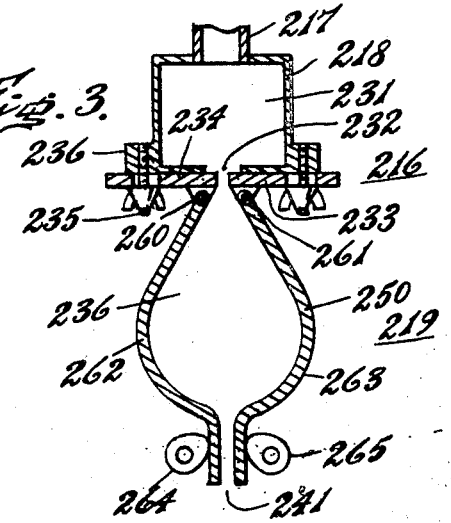
INVENTOR
Walter D. Voelker
BY John R. Eubank
ATTORNEY

United States Patent Office 3,181,199
Patented May 4, 1965

3,181,199
FROTH APPLICATOR
Walter D. Voelker, Philadelphia, Pa., assignor, by mesne assignments, to Allied Chemical Corporation, New York, N.Y., a corporation of New York
Filed Dec. 7, 1961, Ser. No. 157,765
5 Claims. (Cl. 18—4)

This invention relates to apparatus for the manufacture of plastic foam material bonded to sheet material (e.g., textile fabric) and particularly to an applicator for the deposition of plastic froth upon an advancing sheet material.

Heretofore machines have been proposed for the manufacture of sandwich structures comprising two facing sheets and a core of plastic foam such as polyurethane foam. Heretofore there have also been proposals for the manufacture of polyurethane foam articles by the filling of molds with polyurethane froth. Such froth has been prepared by subjecting at least some of the components of the polyurethane foaming composition to a superatmospheric gas pressure, and rapidly releasing the composition comprising dissolved gas at a froth forming nozzle. Articles formed from the polyurethane froth derived from the conventional nozzles have generally had a lower density than could be reliably achieved by alternative techniques. The additional cost of the equipment necessary for producing and processing polyurethane froth has generally been justified on the theory of savings of cost of materials by reason of the lower density of product. Because of the great expense connected with the nozzles of a conventional system for the manufacture of polyurethane froth, numerous techniques have been developed for the transportation of the froth from the nozzle to any of a plurality of molds. Although it is not possible to pump the conventional precursor of polyurethane foam a significant distance because of unpredictable irregularities and variations in the creaming time and rising time of the in situ expanding polyurethane foam, it has been feasible to pump the polyurethane froth for significant distances. This feasibility for the pumping of polyurethane froth for significant distances is highly advantageous in the production of a variety of articles in a variety of molds. Unexpected irregularities in performance make the long distance movement of polyurethane froth highly disadvantageous when continuously producing strips of polyurethane foam.

In accordance with the present invention, a coating machine for the manufacture of a continuous strip of plastic foam on an advancing sheet of material is provided with an applicator for depositing onto the advancing sheet of material a plastic froth, said applicator comprising a broad plenum zone extending across a significant portion of the width of the advancing sheet material, said plenum being spaced within a few inches of the advancing combination, and said applicator comprising a froth-forming slit from which the pressurized gas containing plastic leaves the plenum, so that the froth formation occurs immediately prior to the deposition of the froth onto the advancing sheet of material. The long slit of the applicator is always less than one foot above the top of the froth deposited on the sheet material, and generally less than one foot above the sheet material. Reference is made to the application of Walter D. Voelker, Ser. No. 143,600, filed October 9, 1961, for Preparing Insulated Fabric, of which this application is a continuation in part.

In the accompanying drawings FIG. 1 is a schematic view of coating apparatus of the type which might utilize an applicator of the present invention. FIG. 2 is a sectional schematic view of one type of applicator and froth generator. FIGS. 3 and 4 are sectional views of some alternative embodiments of the invention.

As shown in FIG. 1 a coating apparatus 10 is adapted to advance sheet material 11 (e.g., textile cloth, plastic, paper, or the like) from a supply source 12 through a plurality of zones including coating zone 13, curing zone 14 and product withdrawal zone 15. A froth-forming composition flows at a superatmospheric pressure to an applicator 16 through a supply line 17. The applicator 16 comprises a wide tank 18 and a froth discharge tube 19, and deposits a coating 20 of froth onto the advancing sheet 11. As the sheet advances through the curing zone 14, heat from lamps 21 transforms the froth into plastic foam, whereby the strip of strong plastic foam 22 may be taken as the product at the withdrawal zone 15.

As shown in FIG. 2 an applicator 116 includes a tank 118 defining a plenum chamber 131, supplied with the pressurized resin through the line 117. A slit 132 at the exit of the plenum of the high pressure zone of the applicator 116 permits the composition to flow only at a controlled rate. In flowing from the narrow high pressure slit 132 to an outlet 141, the plastic resin is converted to a plastic froth in a froth-forming chamber 136, and the thus freshly prepared froth is deposited immediately upon the advancing sheet material 111. The slit 132 is schematically shown as between a fixed plate 133 and an adjustable plate 134 having a slot in which a bolt 135 clamps the plate 134 to an arm 135' of the applicator 116. In order to provide adjustment of the outlet 141 of the froth-forming chamber 136, suitable clamped plates are provided. A rear plate 137 is secured through a slot to the applicator 116 by means of clamping bolt 138. A height regulating plate 139 is secured to the applicator 116 by means of clamping bolt 140.

An extremely important feature of the applicator 116 is its extension across the width of the advancing sheet. Thus, in the operation of the applicator 116, the high pressure plenum zone 131 and the froth-forming slit 132 are less than one foot from the advancing sheet 111, and extend across the width thereof. Because of this short distance between the elongated slot 132 and the advancing sheet 111, the metering of the thickness of the froth coating 120 can be precisely controlled and the automatic monitoring of the supply of composition through line 117 can be accomplished.

As shown in FIG. 3, an applicator 216 includes an outlet 241 from which the plastic froth is deposited across the width of the advancing sheet material as described in connection with FIG. 2. Pressurized composition flows through line 217, into plenum 231, through slot 232 into froth-forming chamber 236. Particular attention is directed to the high pressure slit 232 which is adjustable by reason of the movement of each of a pair of plates 233, 234. A clamping bolt 235 through a slot in the plate 234 may be used in adjustably clamping the plate to an arm 235'. During any particular production run, it is generally not desirable to make any adjustment of the slit 232, but when different products are to be prepared from different formulations, the adjustability of the slit 232 provides another degree of control for the manufacturing operations. Similarly, the outlet 241 may be enlarged or reduced by adjusting cams 264, 265, regulating plates 262 and 263. Particular attention is directed to a curved surface 250 adapted to enhance the quality of the froth produced in the froth-forming chamber 236.

As shown in FIG. 4, an applicator 316 may include an outlet 341 from which the plastic froth is deposited across the width of the advancing sheet material. A high pressure slit 332 directs the high pressure resin from plenum 331 into a froth-forming chamber 336 characterized by curved walls 350. In going from the slit 332 to the outlet 334, the material encounters first an increase and then a decrease in cross sectional area by reason of the curved walls 350. Nozzles of circular cross section, employed in making polyurethane froth have previously had curved walls of the type shown in FIG. 4.

Heretofore froth-forming chambers have generally been circular in cross section, as distinguished from the rectangular cross section of the froth-forming chambers 136, 236 and 336. Because the outlet of the applicator of the present invention extends across the width of the advancing sheet, it controls the width of the deposited coating. Particular attention is directed to the requirement for positioning the applicator so that the slit separating the high pressure plenum chamber from the froth-forming chamber is only a short distance from the advancing paper. Not more than 12 inches distance should separate the top of the coating and the slit.

The illustrative embodiments heretofore described are merely examples of the invention which is defined in the appended claims.

The invention claimed is:

1. An applicator for depositing plastic froth transversely across substantially all of the width of a continuously advancing sheet of material, said applicator comprising, in combination, an elongated tank defining a high pressure plenum chamber of substantially uniform transverse cross section, one wall portion of said tank being provided with a froth-forming slit extending coextensively with the major dimension of said tank transversely across the sheet material; conduit supply means connecting to said tank adapted for directing plastic resinous material containing dissolved gas to the plenum chamber under a preselected pressure; a second elongated tank defining a froth-forming chamber subtending the wall portion of the first elongated tank which contains said froth-forming slit, said froth-forming chamber communicating with said plenum chamber only by way of said froth-forming slit and a wall portion of said second tank being provided with a froth deposition opening extending transversely substantially across the full width of said sheet material; and mounting means adapted to secure said applicator in a position with respect to the advancing sheet so that said froth-forming slit is less than one foot from said sheet material in plastic froth depositing relationship thereto.

2. Apparatus according to claim 1 in combination with means for selectable adjustment of the transverse dimension of said froth-forming slit.

3. Apparatus according to claim 1 in combination with adjustment means for controlling the transverse dimension of said froth deposition opening.

4. Apparatus according to claim 2 in combination with means for the adjustment of the transverse dimension of said froth deposition opening.

5. Apparatus according to claim 4 wherein said froth-forming chamber is defined by walls which are curved so that said plastic resinous material is subjected first to expansion and then to contraction forces as it passes therethrough.

References Cited by the Examiner

UNITED STATES PATENTS

| | | | |
|---|---|---|---|
| 1,885,747 | 11/32 | Maurer | 18—15 |
| 2,045,328 | 6/36 | Levey | 18—15 |
| 2,053,920 | 9/36 | Schade et al. | 18—15 |
| 2,329,421 | 9/43 | Shields | 18—15 |
| 2,421,073 | 5/47 | Kratz | 18—15 |
| 2,549,864 | 10/56 | Toulmin | 264—17 |
| 2,899,704 | 8/59 | Pekarek | 18—15 |

FOREIGN PATENTS

| | | |
|---|---|---|
| 531,745 | 10/56 | Canada. |
| 375,243 | 6/32 | Great Britain. |
| 794,454 | 5/58 | Great Britain. |

MICHAEL V. BRINDISI, *Primary Examiner.*